United States Patent
Meller et al.

(10) Patent No.: US 10,635,845 B2
(45) Date of Patent: Apr. 28, 2020

(54) METHOD AND APPARATUS FOR IMPROVING BOOLEAN SATISFIABILITY SOLVER GENERATED BASED ON INPUT DESIGN WITH DATA QUALIFIER SIGNALS

(71) Applicant: Mellanox Technologies, Ltd., Yokneam (IL)

(72) Inventors: Yael Meller, Yokneam (IL); Or Davidi, Yokneam (IL); Roy Armoni, Yokneam (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 29 days.

(21) Appl. No.: 15/953,964

(22) Filed: Apr. 16, 2018

(65) Prior Publication Data

US 2019/0318056 A1    Oct. 17, 2019

(51) Int. Cl.
G06F 17/50    (2006.01)
G06F 30/30    (2020.01)

(52) U.S. Cl.
CPC ................................ *G06F 30/30* (2020.01)

(58) Field of Classification Search
CPC .. G06F 17/5045; G06F 11/263; G06F 17/504; G06F 17/50; G06F 2217/16
See application file for complete search history.

(56) References Cited

U.S. PATENT DOCUMENTS

| 7,610,570 | B1* | 10/2009 | Goldberg | G06F 17/504 716/100 |
| 2012/0317454 | A1* | 12/2012 | Krenz-Baath | G06F 11/263 714/739 |

\* cited by examiner

Primary Examiner — Vuthe Siek
(74) Attorney, Agent, or Firm — Alston & Bird LLP

(57) ABSTRACT

Embodiments are disclosed for solving a Boolean formula generated from an input design using an iterative loop using a computer-implemented Boolean satisfiability solver. An example method includes accessing data qualifier signals indicating one or more variables in a Boolean formula. The example method further includes marking the one or more variables in the Boolean formula as data qualifier variables based on the respective data qualifier signals. The example method further includes instructing a computer implemented Boolean satisfiability solver to solve the Boolean formula using an iterative loop, where operation of the iterative loop is prioritized based on the data qualifier variables. Corresponding apparatuses and non-transitory computer readable storage media are also provided.

15 Claims, 5 Drawing Sheets

US 10,635,845 B2

METHOD AND APPARATUS FOR IMPROVING BOOLEAN SATISFIABILITY SOLVER GENERATED BASED ON INPUT DESIGN WITH DATA QUALIFIER SIGNALS

TECHNOLOGICAL FIELD

Embodiments of the present invention relate generally to improving a Boolean satisfiability solver configured to solve a Boolean formula translated from a technical design written in programming languages.

BACKGROUND

The present invention relates to methods and apparatuses for improving the efficiency of a computer-implemented Boolean satisfiability solver that could be used in a model checking process. In the process of model checking, the technical design of a system, for example a circuit design written in Verilog, is translated into a Boolean formula and given to a Boolean satisfiability solver as input.

BRIEF SUMMARY

Example embodiments described herein solve a Boolean formula generated from a design using a computer-implemented Boolean satisfiability solver that uses an iterative loop. In particular, the iterative loop's operation is prioritized based on data qualifier variables identified for the purpose of improving the efficiency of the Boolean satisfiability solver. The details of some embodiments of the subject matter described in this specification are set forth in the accompanying drawings and the description below. Other features, aspects, and advantages of the subject matter will become apparent from the description, the drawings, and the claims.

In this regard, the invention includes methods, computer program products and apparatuses for solving a Boolean formula. In one example embodiment, a computer implemented method for solving a Boolean formula generated from a design using an iterative loop using a Boolean satisfiability solver is provided, the method includes: accessing data qualifier signals indicating one or more variables in a Boolean formula; marking the one or more variables in the Boolean formula as data qualifier variables based on the respective data qualifier signals; and instructing a computer implemented Boolean satisfiability solver to solve the Boolean formula using an iterative loop, operation of the iterative loop is prioritized based on the data qualifier variables.

In some embodiments of such a method, the Boolean formula is translated from a gate-level model graph, and the one or more variables in the Boolean formula correspond to a set of elements in the gate-level model graph. In some embodiments, the one or more data qualifier signals are associated with the set of elements in the gate-level model graph. In some embodiments, the gate-level model graph is translated from an input circuit design and the set of elements in the gate-level model graph correspond to a set of elements in the input circuit design. In some embodiments, the data qualifier signals are associated with on the set of elements in the input circuit design. In some embodiments, the data qualifier signals are generated by: receiving, via a control interface, user input identifying one or more data qualifier elements in an input design; translating the input design to a Boolean formula, one or more variables in the Boolean formula correspond to the one or more data qualifier elements in the input design; identifying the one or more variables in the Boolean formula that correspond to the one or more data qualifier elements in the input design; and generating data qualifier signals indicating the one or more variables in the Boolean formula that correspond to the one or more data qualifier elements in the input design.

In another example embodiment, an apparatus comprising at least one processor and at least one memory including computer program code is provided. The at least one memory and the computer program code configured to, with the at least one processor, solve a Boolean formula generated from an input design by causing the apparatus to at least: receive data qualifier signals indicating one or more variables in a Boolean formula; mark the one or more variables in the Boolean formula as data qualifier variables based on the respective data qualifier signals; and instruct a computer implemented Boolean satisfiability solver to solve the Boolean formula using an iterative loop, operation of the iterative loop is prioritized based on the data qualifier variables.

In some embodiments of such an apparatus, the Boolean formula is translated from a gate-level model graph, and the one or more variables in the Boolean formula correspond to a set of elements in the gate-level model graph. In some embodiments, the one or more data qualifier signals are associated with the set of elements in the gate-level model graph. In some embodiments, the gate-level model graph is translated from an input circuit design and the set of elements in the gate-level model graph correspond to a set of elements in the input circuit design. In some embodiments, the data qualifier signals are associated with on the set of elements in the input circuit design. In some embodiments, the data qualifier signals are generated by: receiving, via a control interface, user input identifying one or more data qualifier elements in an input design; translating the input design to a Boolean formula, one or more variables in the Boolean formula correspond to the one or more data qualifier elements in the input design; identifying the one or more variables in the Boolean formula that correspond to the one or more data qualifier elements in the input design; and generating data qualifier signals indicating the one or more variables in the Boolean formula that correspond to the one or more data qualifier elements in the input design.

In yet another example embodiment, a computer program product comprising at least one non-transitory computer readable storage medium is provided. The non-transitory computer readable storage medium storing instructions that, when executed by a processor, cause the processor to configure an apparatus to at least: receive data qualifier signals indicating one or more variables in a Boolean formula; mark the one or more variables in the Boolean formula as data qualifier variables based on the respective data qualifier signals; and instruct a computer implemented Boolean satisfiability solver to solve the Boolean formula using an iterative loop, operation of the iterative loop is prioritized based on the data qualifier variables.

In some embodiments of such a computer program product, the Boolean formula is translated from a gate-level model graph, and the one or more variables in the Boolean formula correspond to a set of elements in the gate-level model graph. In some embodiments, the one or more data qualifier signals are associated with the set of elements in the gate-level model graph. In some embodiments, the gate-level model graph is translated from an input circuit design and the set of elements in the gate-level model graph correspond to a set of elements in the input circuit design. In some embodiments, the data qualifier signals are associated with on the set of elements in the input circuit design. In some embodiments, the data qualifier signals are generated by: receiving, via a control interface, user input identifying one or more data qualifier elements in an input design; translating the input design to a Boolean formula, one or more variables in the Boolean formula correspond to the one or more data qualifier elements in the input design; identifying the one or more variables in the Boolean formula that correspond to the one or more data qualifier elements in the input design; and generating data qualifier signals indicating the one or more variables in the Boolean formula that correspond to the one or more data qualifier elements in the input design.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
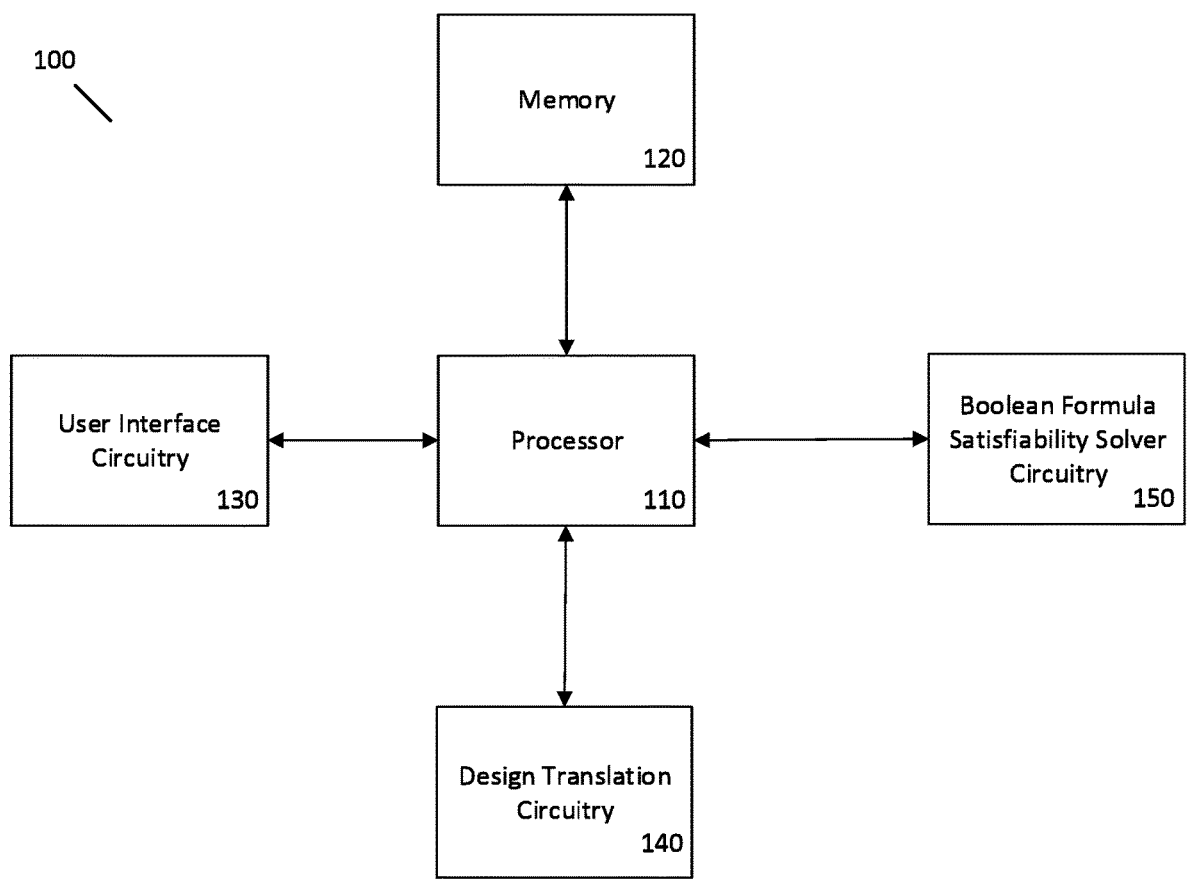
Figure 2:
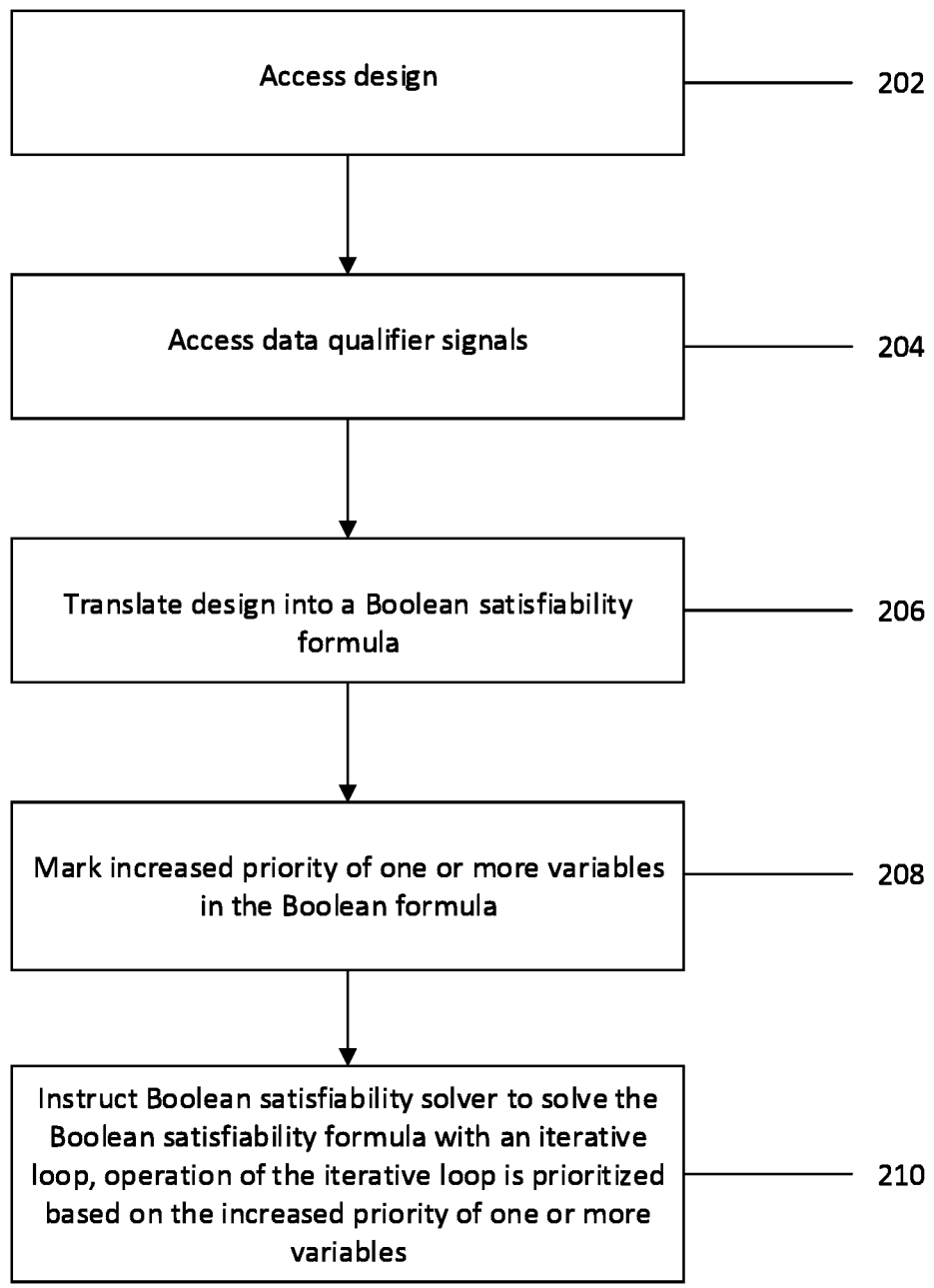
Figure 3:
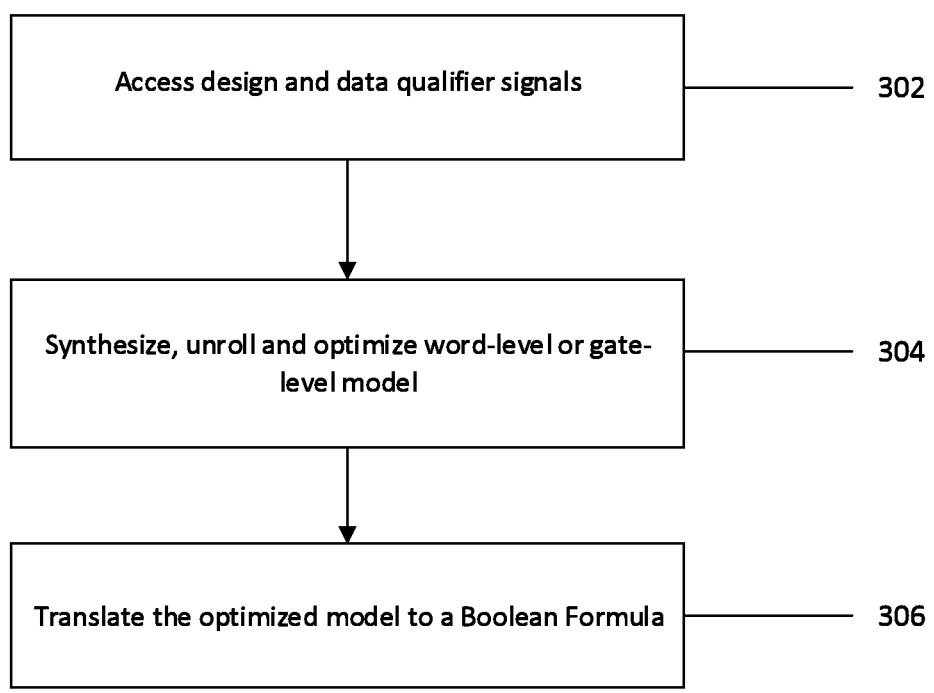
Figure 4:
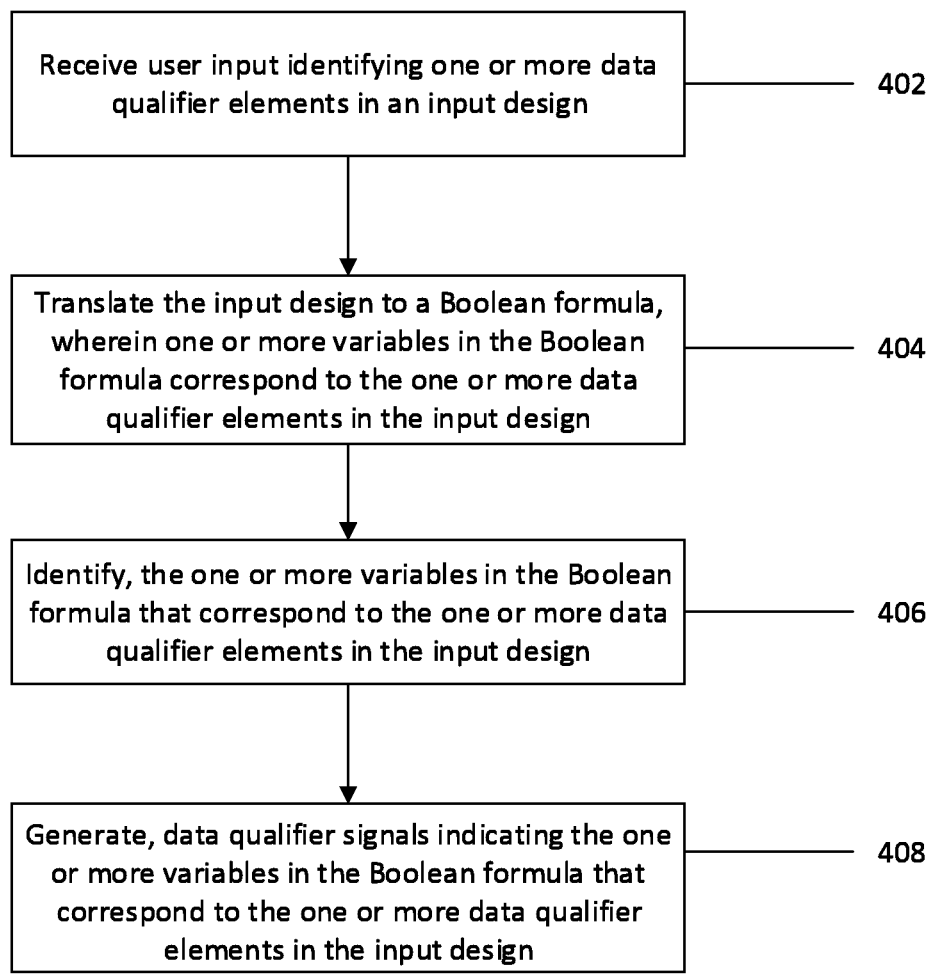
Figure 5:
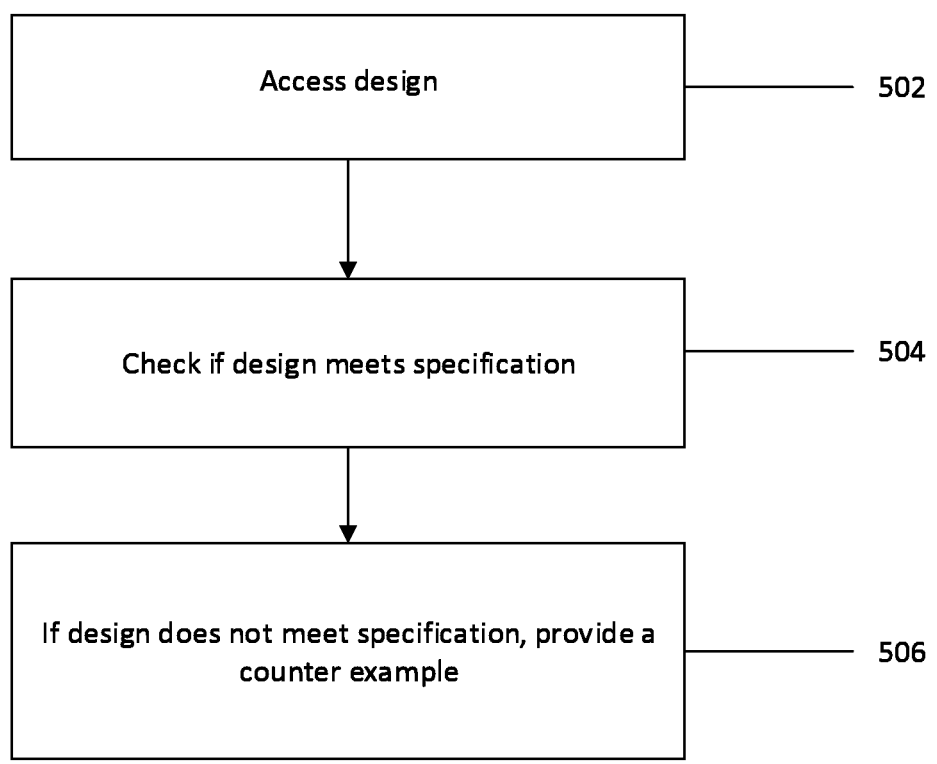

Having thus described the disclosure in general terms, reference will now be made to the accompanying drawings, which are not necessarily drawn to scale, and wherein:

FIG. 1 illustrates a block diagram of an example apparatus for receiving a design and solving a Boolean formula generated based on the design according to example embodiments of the invention;

FIG. 2 is a flowchart illustrating an example method of solving a Boolean formula translated from an input design using a Boolean satisfiability solver according to example embodiments of the invention;

FIG. 3 is a flowchart illustrating an example method of translating a circuit design into a Boolean formula according to example embodiments of the invention;

FIG. 4 is a flowchart illustrating an example method of generating data qualifier signals based on user input according to example embodiments of the invention; and FIG. 5 is a flow chart illustrating an example method of model checking according to example embodiments of the invention.

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "data packet," "data stream," "content," "information," and similar terms may be used interchangeably, according to some example embodiments, to refer to data capable of being transmitted, received, operated on, processed, and/or stored. Moreover, the term "exemplary," as may be used herein, is not provided to convey any qualitative assessment, but instead merely to convey an illustration of an example. Thus, use of any such terms should not be taken to limit the spirit and scope of embodiments of the present invention.

In the process of model checking, the technical design (including the specification associated with the design) of a system, for example a circuit design written in Verilog, is translated into a Boolean formula and provided to a Boolean satisfiability solver as input. Boolean satisfiability solving is the process of finding a satisfying assignment of values to variables for a given Boolean formula. The basic implementation of a Boolean satisfiability solver is to traverse and check all possible assignments to the variables of the formula using an iterative loop. The process of Boolean satisfiability solving can require significant computer resources (e.g., processing power, memory, etc.) as the Boolean formula may be huge for a complex design. Conventional computer-implemented Boolean satisfiability solvers implement optimizations and heuristics during the Boolean satisfiability solving process. Such optimizations and heuristics are directed to the Boolean formula translated from the input design. The optimizations often attempt to identify which variables represent data qualifiers (control variables) based on the Boolean formula itself. However, such optimizations cannot efficiently utilize any information or knowledge about the original design itself. Often times, certain elements in the input design are controlling the workflow of the designs; and these elements correspond to a set of variables in the Boolean formula. Thus, without considering the input design in the Boolean satisfiability solving process, knowledge regarding the workflow of the design cannot be efficiently utilized, resulting in a waste of computing resources.

Accordingly, there is a latent need for tools that improve the efficiency of a Boolean satisfiability solver based on the input design in the model checking process. Through applied effort, ingenuity, and innovation, this and other problems have been solved by embodiments of the present disclosure, many examples of which are described in detail herein. An example embodiment of the present disclosure is able to improve the operating efficiency of a modern computer-implemented Boolean satisfiability solver used for circuit design model checking by 7%.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

FIG. 1 illustrates a block diagram of an example apparatus for receiving a design and solving a Boolean formula generated based on the design. The apparatus of FIG. 1 may be incorporated into or embodied by a computing system that includes a display for displaying a model checker. The model checker may include an interface that allow users to input an indication of data qualifier signals. In some embodiments, the apparatus may be embodied by a mobile terminal or a fixed computing device that includes or is otherwise associated with the display. Alternatively, the apparatus may be separate from the computing system or at least separate from the display that is associated with the computing system, but may be in communication with the computing system, such as via wireline or wireless communications.

It should also be noted that while FIG. 1 illustrates one example of a configuration of a computing system 100 for receiving a design and solving a Boolean formula generated based on the design, numerous other configurations may also be used to implement embodiments of the present invention. As such, in some embodiments, although devices or elements are shown as being in communication with each other, hereinafter such devices or elements should be considered as capable of being embodied within the same device or element and thus devices or elements shown in communication should be understood to alternatively be portions of the same device or element. Computing system 100 may be included in a model checker computing system.

The computing system 100 may include or otherwise be in communication with a processor 110, memory circuitry 120, user interface circuitry 130, design translation circuitry 140, and Boolean formula satisfiability solver circuitry 150. In some embodiments, the processor 110 (which may include multiple or co-processors or any other processing circuitry associated with the processor) may be in communication with the memory circuitry 120. The memory circuitry 120 may comprise non-transitory memory circuitry and may include one or more volatile and/or non-volatile memories. In some examples, the memory circuitry 120 may be an electronic storage device (e.g., a computer readable storage medium) configured to store data that may be retrievable by the processor 110. In some examples, the data stored in the memory 120 may include a design (e.g., a design written in VHDL, Verilog, SMV, other hardware description languages, or the like), and/or Boolean formulas generated based on a design. The memory circuitry 120 may also be configured to store information, data, content, applications, computer program instructions (or computer program code) or the like for enabling the apparatus to carry out various functions or methods in accordance with embodiments of the present invention, described herein.

As described above, the computing system 100 may be embodied by a computing device, such as a mobile terminal or a fixed computing device. In some embodiments, the apparatus may be embodied as a chip or chip set. For example, the apparatus may comprise one or more physical packages (e.g., chips) including materials, components, and/or wires on a structural assembly.

In some examples, the processor 110 may be embodied in a number of different ways. For example, the processor may be embodied as one or more of various hardware processing means such as a microprocessor, a coprocessor, a digital signal processor (DSP), a controller, or a processing element with or without an accompanying DSP. The processor 110 may also be embodied on various other processing circuitry including integrated circuits such as, for example, an FPGA (field programmable gate array), a microcontroller unit (MCU), an ASIC (application specific integrated circuit), a hardware accelerator, or a special-purpose electronic chip. Furthermore, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multi-threading.

In an example embodiment, the processor 110 may be configured to execute instructions, such as computer program code or instructions, stored in the memory circuitry 120 or otherwise accessible to the processor 110. Alternatively or additionally, the processor 110 may be configured to execute hard-coded functionality. As such, whether configured by hardware or software instructions, or by a combination thereof, the processor 110 may represent a computing entity (e.g., physically embodied in circuitry) configured to perform operations according to an embodiment of the present invention described herein. For example, when the processor 110 is embodied as an ASIC, FPGA, or similar, the processor may be configured as hardware for conducting the operations of an embodiment of the invention. Alternatively, when the processor 110 is embodied to execute software or computer program instructions, the instructions may specifically configure the processor 110 to perform the algorithms and/or operations described herein when the instructions are executed. However, in some cases, the processor 110 may be a processor of a device (e.g., a mobile terminal or a fixed computing device) specifically configured to employ an embodiment of the present invention by further configuration of the processor by instructions for performing the algorithms and/or operations described herein. The processor 110 may further include a clock, an arithmetic logic unit (ALU) and logic gates configured to support operation of the processor 110, among other things.

In some embodiments, the user interface circuitry 130 is in communication with the processor 110 to provide output to a user and, in some embodiments, to receive a user input. For example, the user interface circuitry 130 may be configured to communicate with the display and, in some embodiments, may also may be configured to communicate with a keyboard, a mouse, one or more microphones, a speaker, or other input/output mechanisms. In one embodiment, the user interface may include the display upon which visual representation(s) are presented. Example visual representations may include a technical design (including a specification associated with the design), a gate-level model graph generated based on technical design, a Boolean formula generated based on the gate-level model graph, an interface that allows user input of indication of data qualifier signals, the results of solving the Boolean formula, which may include a counter-example for an unsatisfiable formula, and the like. A user may be able to input a design (e.g., a design written in VHDL, Verilog, SMV, other hardware description languages, and the like), data qualifier signals denoting elements in the design, and the like. The processor 110 and/or user interface circuitry 130 may further be configured to control one or more functions of one or more user interface elements through computer program instructions (e.g., software and/or firmware) stored on the memory circuitry 120.

In some embodiments, the design translation circuitry 140 may be in communication with the processor 110 to enable or otherwise provide the functions of the methods described herein for translating a design into a Boolean formula.

In some embodiments, the Boolean formula satisfiability solver circuitry may be configured to solve a Boolean formula, for example a Boolean formulate translated from a design.

FIGS. 2 to 5 illustrate example flowcharts of the operations performed by an apparatus, such as the computing system 100 of FIG. 1, in accordance with example embodiments of the present invention. It will be understood that each block of the flowcharts, and combinations of blocks in the flowcharts, may be implemented by various means, such as hardware, firmware, one or more processors, circuitry and/or other devices associated with the execution of software including one or more computer program instructions. For example, one or more of the procedures described above may be embodied by computer program instructions. In this regard, the computer program instructions which embody the procedures described above may be stored by a memory 120 of an apparatus employing an embodiment of the present invention and executed by a processor 110 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 2 to 5, when executed, convert a computer or processing circuitry into a particular machine configured to perform an example embodiment of the present invention. Accordingly, the operations of FIGS. 2 to 5 define an algorithm for configuring a computer or processor to perform an example embodiment. In some cases, a general purpose computer may be provided with an instance of the processor which performs the algorithm of FIGS. 2 to 5 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with any others among the features described herein.

FIG. 2 is a flowchart illustrating an example method for solving a Boolean formula translated from an input design using a Boolean satisfiability solver performed by the computing system 100.

In some embodiments, at operation 202, the computing system 100 is configured to access a design, such as a design (including a specification associated with the design) written in VHDL, Verilog, SMV, other hardware description languages, or the like. In some embodiments, the design may also be a design written in other programming languages such as C, C++, C #, Java, LOTOS, Lustre, MCRL2, PROMELA, or the like. The design may be stored in a memory 120, and/or received via user interface circuitry 130 based on user input.

In some embodiments, at operation 204, the computing system 100 is configured to receive data qualifier signals indicating one or more variables in the Boolean formula translated from the design. The data qualifier signals may be received via the user interface circuitry 130. The data qualifier signals represent elements in the design. Because elements in the design correspond to the variables in the Boolean formula translated from design, the data qualifier signals also indicate variables in the Boolean formula. During the translation of the design into a Boolean formula (206), the data qualifier signals further indicate elements in a word-level model graph or a gate-level model graph that correspond with elements in the circuit design identified by the data qualifier signals. Additionally, the data qualifier signals indicate variables in the Boolean formula that represent data qualifier signals in the circuit design. In some embodiments, the data qualifier signals denote variables that should be prioritized by a Boolean satisfiability solver. One example method of generating data qualifier signals based on user input is described below in conjunction with FIG. 4.

In some embodiments, at operation 206, the computing system 100 is configured to translate the design into a Boolean formula. The process of translating a design into a Boolean formula may be performed by the design translation circuitry 140. The variables in the Boolean formula correspond to elements (such as logical gates, modules and/or edges, nodes, data, operations, and the like) in the design. For a design written in VHDL, Verilog, SMV, or other hardware description languages, the design may be first translated into a word-level model graph and then translated to a gate-level model graph based on the word-level model graph. Then the gate-level model graph may be translated into a Boolean formula. Elements that correspond to data qualifier signals are identified and marked as data qualifier elements throughout the translation process. The details regarding translating a circuit design into a Boolean formula are described below with reference to FIG. 3.

According to some embodiments, at operation 208, the computing system 100 is configured to mark one or more variables in the Boolean formula as data qualifier variables based on the respective data qualifier signals. In some embodiments, the computing system 100 identifies which variables in the Boolean formula each data qualifier signal correspond to and then mark increased priority of the one or more variables in the Boolean formula based on the respective data qualifier signals. The increased priority may be marked in the Boolean satisfiability solver.

In some embodiments, the computing system 100 or the design translation circuitry 140 of the computing system 100 may mark elements in the design or elements in the word-level model graph or the gate-level model graph translated from the design as data qualifier elements based on the data qualifier signals. The marking may be performed in the process of translating a design to a Boolean formula. The design translation circuitry 140 may be configured to propagate a data qualifier mark during the process of translating the design into a Boolean formula. For example, if an element in a circuit design is identified as a data qualifier element, the element in a word-level model graph translated from the circuit design that corresponds to the data qualifier element in the circuit design may also be marked as a data qualifier element. If an element in a word-level model graph is marked as a data qualifier element, the element in a gate-level model graph translated from the word-level model graph may also be marked as a data qualifier element. If an element in gate-level model graph is marked as a data qualifier element, the variable in the Boolean formula translated from the gate-level model graph may be marked as a data qualifier variable. Therefore, data qualifier signals indicating data qualifier elements in the original circuit design would eventually identify variables in the Boolean formula because information regarding which elements are identified as data qualifier elements in the original circuit design is propagated in the translation process. The variables that are identified by the data qualifier signals are marked as data qualifier variables and prioritized during the process of Boolean formula solving.

At operation 210, the computing system 100 is configured to instruct a computer-implemented Boolean satisfiability solver, such as the Boolean formula satisfiability solver circuitry 150, to solve the Boolean formula using an iterative loop. In some embodiments, the operation of the iterative loop is prioritized based on the data qualifier variables. One example operation of the iterative loop is to give the data qualifier variables highest priority and begin the iterative loop with the data qualifier variables. In some embodiments, the priority is provided only as an initial configuration to the Boolean Satisfiability solver in order not to interfere with the heuristics of the solver.

FIG. 3 is a flowchart illustrating an example method of translating a circuit design into a Boolean formula according to example embodiments of the present invention. The example method may be performed by the design translation circuitry 140 of the computing system 100. In some embodiments, at operation 302, the design translation circuitry 140 is configured to access a circuit design and a set of data qualifier signals identifying elements in the design. The circuit design may take the form of a design written in VHDL, Verilog, SMV, other hardware description languages, or the like. The elements identified by the set of data qualifier signals are marked as data qualifier elements.

At operation 304, the design translation circuitry 140 may be configured to synthesize, unroll and optimize a word-level or a gate-level model based on the circuit design. During the process of synthesizing, unrolling and optimize a word-level or a gate-level model, elements in the word-level or gate-level model graph that correspond to the data qualifier element in the circuit design are identified and marked as data qualifier elements.

At operation 306, the design translation circuitry 140 may be configured to translate the word-level or gate-level model graph to a Boolean formula. One or more variables in the Boolean formula that correspond with data qualifier elements in the word-level or gate-level model graph are marked as data qualifier variables. The data qualifier variables are marked with increased priority compared to other variables in the Boolean formula.

FIG. 4 is a flowchart illustrating an example method of generating data qualifier signals based on user input. The example method may be performed by the computing system 100 or another computing system. In some embodiments, at operation 402, the computing system 100 is configured to receive user input identifying one or more data qualifier elements in an input design. The user input may be received via user interface circuitry 130. The user often has knowledge of his/her own design and knows which elements in the design are controlling the work flow of the entire design. Therefore, the user may be able to identify elements that are controlling the work flow of the entire design as data qualifier elements. In some embodiments, at operation 404, the computing system 100 may be configured to translate the input design to a Boolean formula. One or more variables in the Boolean formula may thus correspond to the one or more data qualifier elements in the input design. The process of translating the input design to a Boolean formula may be performed by the design translation circuitry 140.

At operation 406, the computing system 100 may be configured to identify the one or more variables in the Boolean formula correspond to the one or more data qualifier elements in the input design. Operation 406 may be performed during operation 404.

At operation 408, the computing system 100 may be configured to associate high priority with data qualifier signals indicating the one or more variables in the Boolean formula that correspond to the one or more data qualifier elements in the input design.

FIG. 5 is a flow chart illustrating an example method of model checking using embodiments of the present invention. The operation of FIG. 5 may be performed by a computer-implemented model checker. In some embodiments, at operation 502, a model checker may access the design (including the specification associated with the design). At operation 504, the model checker may check to see if the design meets the specification. The model checker may also check if the design meets the specification by translating the design and specification into a Boolean formula and may attempt to solve the Boolean formula. The process of checking if the design meets the specification by translating the design and specification into a Boolean formula and solving the Boolean formula may be in accordance with the methods illustrated in FIGS. 2 to 4. The model checker may utilize a Boolean satisfiability solver using an iterative loop to solve the Boolean formula; the operation of the iterative loop may be prioritized based on a set of data qualifier variables. If the Boolean formula is successfully solved, the model checker would determine that the design meets the specification. If the Boolean formula cannot be solved, the model checker would determine that the design does not the specification. At operation 506, the model checker may provide a counter example to the Boolean formula if the design does not meet the specification.

Without methods and apparatuses illustrated in the present application, a computer-implemented Boolean satisfiability solver would not be able to efficiently optimize computer-implemented Boolean satisfiability solvers utilized by computer-implemented model checkers. Operation of a computer-implemented model checkers are improved by methods and apparatuses illustrated in the present application, resulting in the saving of computational resources of a computing system during the model checking process.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A computer implemented method for design checking using an iterative loop using a Boolean satisfiability solver, comprising:
   accessing data qualifier signals indicating one or more variables in a Boolean formula generated based on an input design, wherein the input design is associated with a specification, and wherein the data qualifier signals are generated by:
      receiving, via a control interface, user input identifying one or more data qualifier elements in an input design,
      translating the input design to the Boolean formula, wherein one or more variables in the Boolean formula correspond to the one or more data qualifier elements in the input design,
      identifying the one or more variables in the Boolean formula that correspond to the one or more data qualifier elements in the input design, and
      generating data qualifier signals indicating the one or more variables in the Boolean formula that correspond to the one or more data qualifier elements in the input design,
   marking the one or more variables in the Boolean formula as data qualifier variables based on the respective data qualifier signals;
   instructing a computer implemented Boolean satisfiability solver to solve the Boolean formula using an iterative loop, wherein operation of the iterative loop is prioritized based on the data qualifier variables; and
   determining that the input design meets the specification in an instance in which the computer implemented Boolean satisfiability solver solves the Boolean formula.

2. The method of claim 1, wherein the Boolean formula is translated from a gate-level model graph, and wherein the one or more variables in the Boolean formula correspond to a set of elements in the gate-level model graph.

3. The method of claim 2, wherein the one or more data qualifier signals are associated with the set of elements in the gate-level model graph.

4. The method of claim 2, wherein the gate-level model graph is translated from an input circuit design and wherein the set of elements in the gate-level model graph correspond to a set of elements in the input circuit design.

5. The method of claim 4, wherein the data qualifier signals are associated with on the set of elements in the input circuit design.

6. An apparatus comprising at least one processor and at least one memory including computer program code, the at least one memory and the computer program code configured to, with the at least one processor, check a design by causing the apparatus to at least:
   receive data qualifier signals indicating one or more variables in a Boolean formula generated based on an input design, wherein the input design is associated with a specification, and wherein the data qualifier signals are generated by:
      receiving, via a control interface, user input identifying one or more data qualifier elements in an input design,
      translating the input design to a Boolean formula, wherein one or more variables in the Boolean formula correspond to the one or more data qualifier elements in the input design,
      identifying the one or more variables in the Boolean formula that correspond to the one or more data qualifier elements in the input design, and
      generating data qualifier signals indicating the one or more variables in the Boolean formula that correspond to the one or more data qualifier elements in the input design;
   mark the one or more variables in the Boolean formula as data qualifier variables based on the respective data qualifier signals;
   instruct a computer implemented Boolean satisfiability solver to solve the Boolean formula using an iterative loop, wherein operation of the iterative loop is prioritized based on the data qualifier variables; and
   determine that the input design meets the specification in an instance in which the computer implemented Boolean satisfiability solver solves the Boolean formula.

7. The apparatus of claim 6, wherein the Boolean formula is translated from a gate-level model graph, and wherein the one or more variables in the Boolean formula correspond to a set of elements in the gate-level model graph.

8. The apparatus of claim 7, wherein the one or more data qualifier data qualifier signals are associated with the set of elements in the gate-level model graph.

9. The apparatus of claim 7, wherein the gate-level model graph is translated from an input circuit design and wherein the set of elements in the gate-level model graph correspond to a set of elements in the input circuit design.

10. The apparatus of claim 9, wherein the data qualifier signals are associated with the set of elements in the input circuit design.

11. A computer program product comprising at least one non-transitory computer readable storage medium, the non-transitory computer readable storage medium storing instructions that, when executed by a processor, cause the processor to configure an apparatus to at least:
   receive data qualifier signals indicating one or more variables in a Boolean formula generated based on an input design, wherein the input design is associated with a specification, and wherein the data qualifier signals are generated by:
      receiving, via a control interface, user input identifying one or more data qualifier elements in an input design,
      translating the input design to a Boolean formula, wherein one or more variables in the Boolean formula correspond to the one or more data qualifier elements in the input design, identifying the one or more variables in the Boolean formula that correspond to the one or more data qualifier elements in the input design, and generating data qualifier signals indicating the one or more variables in the Boolean formula that correspond to the one or more data qualifier elements in the input design;

mark the one or more variables in the Boolean formula as data qualifier variables based on the respective data qualifier signals;

instruct a computer implemented Boolean satisfiability solver to solve the Boolean formula using an iterative loop, wherein operation of the iterative loop is prioritized based on the data qualifier variables; and determine that the input design meets the specification in an instance in which the computer implemented Boolean satisfiability solver solves the Boolean formula.

12. The computer program product of claim 11, wherein the Boolean formula is translated from a gate-level model graph, and wherein the one or more variables in the Boolean formula correspond to a set of elements in the gate-level model graph.

13. The computer program product of claim 12, wherein the one or more data qualifier data qualifier signals are associated with the set of elements in the gate-level model graph.

14. The computer program product of claim 12, wherein the gate-level model graph is translated from an input circuit design and wherein the set of elements in the gate-level model graph correspond to a set of elements in the input circuit design.

15. The computer program product of claim 14, wherein the data qualifier signals are determined based on the set of elements in the input circuit design.

* * * * *